US012707433B2

(12) United States Patent
Ai et al.

(10) Patent No.: US 12,707,433 B2
(45) Date of Patent: Aug. 11, 2026

(54) SCHEDULING AND TRANSMISSION OF SYSTEM INFORMATION

(71) Applicant: ZTE CORPORATION, Shenzhen (CN)

(72) Inventors: Jianxun Ai, Shenzhen (CN); Xiubin Sha, Shenzhen (CN); He Huang, Shenzhen (CN); Jing Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 301 days.

(21) Appl. No.: 18/501,116

(22) Filed: Nov. 3, 2023

(65) Prior Publication Data

US 2024/0188039 A1 Jun. 6, 2024

Related U.S. Application Data

(63) Continuation of application No. PCT/CN2021/092316, filed on May 8, 2021.

(51) Int. Cl.
*H04W 68/02* (2009.01)
*H04W 76/28* (2018.01)

(52) U.S. Cl.
CPC ........... *H04W 68/02* (2013.01); *H04W 76/28* (2018.02)

(58) Field of Classification Search
CPC ......... H04W 52/0216; H04W 52/0229; H04W 52/028; H04W 68/02; H04W 76/28; Y02D 30/70
See application file for complete search history.

(56) References Cited

U.S. PATENT DOCUMENTS

| | | | | |
|---|---|---|---|---|
| 11,470,577 | B2 * | 10/2022 | Lee | H04W 24/10 |
| 11,659,519 | B2 * | 5/2023 | Agiwal | H04W 68/02 455/458 |
| 12,262,259 | B2 * | 3/2025 | Tan | H04W 36/0061 |
| 2019/0254104 | A1 * | 8/2019 | Gurumoorthy | H04W 76/27 |

(Continued)

FOREIGN PATENT DOCUMENTS

| | | |
|---|---|---|
| CN | 106961729 A | 7/2017 |
| CN | 109246803 A | 1/2019 |

(Continued)

OTHER PUBLICATIONS

Extended European Search Report for EP Appl. No. 21941041.2, dated Jun. 5, 2024 (11 pages).

(Continued)

*Primary Examiner* — Dung B Huynh
(74) *Attorney, Agent, or Firm* — Foley & Lardner LLP

(57) ABSTRACT

A method of wireless communication includes making a first determination, by a wireless device, that the wireless device is configured for a discontinuous reception operation in an idle state with a first cycle duration value that is above a threshold, and in an inactive state with a second cycle duration value equal to or below the threshold, making a second determination, based on the first determination, of a first paging frame value to be used inside a paging time window using a first formula, wherein the first formula is based on the second cycle duration; and performing a paging operation according to the first determination and/or the second determination.

8 Claims, 10 Drawing Sheets

(56) References Cited

U.S. PATENT DOCUMENTS

2021/0314979 A1* 10/2021 Agiwal ................. H04L 5/0032
2022/0078872 A1* 3/2022 Shrestha ............... H04W 68/12
2023/0014303 A1* 1/2023 Di Girolamo ........ H04W 72/20
2023/0097437 A1* 3/2023 Chung .................. H04W 76/16 370/328
2023/0101731 A1* 3/2023 Sui ........................ H04W 76/27 455/458
2023/0107347 A1* 4/2023 Nader ................... H04W 76/25 455/522
2023/0247656 A1* 8/2023 Sha ....................... H04W 72/53
2023/0283425 A1* 9/2023 Kazmi .................. H04L 5/0048 370/329
2023/0292288 A1* 9/2023 Ai ......................... H04W 68/02
2023/0319784 A1* 10/2023 Hu ........................ H04W 68/02
2023/0337184 A1* 10/2023 Li ......................... H04W 76/28
2023/0388966 A1* 11/2023 He .................... H04W 52/0216
2023/0397158 A1* 12/2023 Hossain .............. H04W 68/005
2023/0422210 A1* 12/2023 Li ..................... H04W 52/0229
2023/0422214 A1* 12/2023 Tan ..................... H04W 56/005
2024/0147571 A1* 5/2024 Koskinen .............. H04W 76/27
2024/0179792 A1* 5/2024 Höglund ............... H04W 76/28
2024/0187990 A1* 6/2024 Chen ..................... H04W 76/28
2024/0196371 A1* 6/2024 Lauridsen ............. H04W 68/02
2024/0224103 A1* 7/2024 Koskinen .............. H04W 24/10
2024/0341006 A1* 10/2024 Jeong .................. H04W 68/005
2024/0357552 A1* 10/2024 Jeong ................ H04W 52/0235
2025/0008485 A1* 1/2025 Li ......................... H04W 24/08

FOREIGN PATENT DOCUMENTS

CN 111096011 A 5/2020
WO WO-2018/088840 A1 5/2018

OTHER PUBLICATIONS

Intel Corporation, "Summary of offline 101—[Redcap] eDRX cycles—second round", 3GPP TSG RAN WG2 Meeting #113bis-e, R2-2104367, Apr. 20, 2021, Electronic meeting (34 pages).
Intel Corporation, "Summary of offline 101—[Redcap] eDRX cycles—second round", 3GPP TSG RAN WG2 Meeting #113bis-e, R2-210xxxx, Apr. 20, 2021, Electronic Meeting (25 pages).
International Search Report and Written Opinion for PCT Appl. No. PCT/CN2021/092316, mailed on Jan. 29, 2022 (8 pages).
ZTE Corporation et al., "Discussion on eDRX for RedCap UE", 3GPP TSG-RAN WG2 Meeting #113 bis electronic, R2-2103039, Apr. 20, 2021, Online (6 pages).
Notice of Grounds of Rejection for JP Appl. No. 2023-568563, dated May 20, 2025 (with English translation, 5 pages).
Decision to Grant a Patent for JP Appl. No. 2023-568563, dated Sep. 9, 2025 (with English translation, 5 pages).

* cited by examiner

250

300

350

SCHEDULING AND TRANSMISSION OF SYSTEM INFORMATION

CROSS-REFERENCE TO RELATED PATENT APPLICATIONS

This application is a Continuation of PCT Application No. PCT/CN2021/092316, filed May 8, 2021, incorporated herein by reference in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for operation of paging in a wireless network.

In one example aspect, a method for wireless is disclosed. The method includes making a first determination, by a wireless device, that the wireless device is configured for a discontinuous reception operation in an idle state with a first cycle duration value that is above a threshold, and in an inactive state with a second cycle duration value equal to or below the threshold; making a second determination, based on the first determination, of a first paging frame value to be used inside a paging time window using a first formula, wherein the first formula is based on the second cycle duration; and performing a paging operation according to the first determination and/or the second determination.

In another example aspect, a method for wireless communication includes making a first determination, by a wireless device, that the wireless device is configured for a discontinuous reception operation in an idle state with a first cycle duration value that is above a threshold, and in an inactive state with a second cycle duration value equal to or below the threshold; making a second determination, based on the first determination, of a first paging occasion value to be used outside a paging time window using a first formula, wherein the first formula is based on (a) in case that a device-specific discontinuous cycle duration is not preconfigured for the wireless device, a default discontinuous reception cycle duration in the wireless network, or (b) in case that the device-specific discontinuous cycle duration is preconfigured for the wireless device, a minimum of the default discontinuous reception cycle duration in the wireless network and the device-specific discontinuous cycle duration; and performing a paging operation according to the first determination and/or the second determination.

In another example aspect, a method for wireless communication includes making a first determination, by a network device, that the wireless device is configured for a discontinuous reception operation in an idle state with a first cycle duration value that is above a threshold, and in an inactive state with a second cycle duration value equal to or below the threshold; making a second determination, based on the first determination, of a first paging frame value to be used inside a paging time window using a first formula, wherein the first formula is based on the second cycle duration; and performing a paging operation according to the first determination and/or the second determination.

In another example aspect, a method for wireless communication includes making a first determination, by a wireless device, that the wireless device is configured for a discontinuous reception operation in an idle state with a first cycle duration value that is above a threshold, and in an inactive state with a second cycle duration value equal to or below the threshold; making a second determination, based on the first determination, of a first paging occasion value to be used outside a paging time window using a first formula, wherein the first formula is based on (a) in case that a device-specific discontinuous cycle duration is not preconfigured for the wireless device, a default discontinuous reception cycle duration in the wireless network, or (b) in case that the device-specific discontinuous cycle duration is preconfigured for the wireless device, a minimum of the default discontinuous reception cycle duration in the wireless network and the device-specific discontinuous cycle duration; and performing a paging operation according to the first determination and/or the second determination.

In another example aspect, a method for wireless communication includes making a determination, by a wireless device in a wireless network, that the wireless device is configured for a discontinuous reception operation in an idle state with a first cycle duration value that is above a threshold, and an extended discontinuous reception operation is not configured for an inactive state for the wireless device; and performing a paging operation using a paging occasion using a first formula based on a minimum of (a) in case that a device-specific discontinuous cycle duration is not configured for the wireless device, the default discontinuous reception cycle duration in the wireless network, or (b) in case that the device-specific discontinuous cycle duration is preconfigured for the wireless device, a minimum of the default discontinuous reception cycle duration in the wireless network and the device-specific discontinuous cycle duration.

In another example aspect, a method for wireless communication includes making a determination, by a network device in a wireless network, that a wireless device is configured for a discontinuous reception operation in an idle state with a first cycle duration value that is above a threshold, and an extended discontinuous reception operation is not configured for an inactive state for the wireless device; and performing a paging operation using a paging occasion using a first formula based on a minimum of (a) in case that a device-specific discontinuous cycle duration is not configured for the wireless device, the default discontinuous reception cycle duration in the wireless network, or (b) in case that the device-specific discontinuous cycle duration is preconfigured for the wireless device, a minimum of the default discontinuous reception cycle duration in the wireless network and the device-specific discontinuous cycle duration.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of 5G wireless protocol. However, applicability of the disclosed techniques is not limited to only 5G wireless systems.

The following abbreviations are used in the present document.

5G—Fifth Generation
CN—Core Network
DRX—Discontinuous Reception
eDRX—Extended Discontinuous Reception
H-SFN—Hyper system frame number
LTE—Long Term Evolution (standard)
NAS—Network Access Stratum
NR—New Radio (standard)
PCCH—Paging Control Channel
PH—Paging hyper frame
PF—Paging frame
PO—Paging occasion
PTW—Paging time window
RAN—Radio Access Network
RAN paging cycle—UE specific cycle for RAN-initiated paging
Redcap Reduced capability
RRC—Radio resource control
SFN—System frame number
TMSI—Temporary Mobile Subscriber Identifier
UE—User Equipment

1. Brief Introduction

Recently, to support radio access by devices with limited computational and/or battery resources, such as industrial sensors, smart wearables, video surveillance cameras, etc., a kind of low cost and low complexity or reduced capability device support is introduced on the top of 5G NR system. These, and other, wireless devices that are capable of wireless transmission or reception are referred to as user equipment (UE) in the present document.

One of the mechanisms provided for efficient use of resources of such devices is the use of discontinuous reception in which a UE is allowed/expected to power down its reception circuitry to save power and wireless bandwidth. Due to coordination between a network device and the UE about when and for how long UE will be configured for discontinuous reception (DRX), this mechanism allows for a UE to operate in a low power consumption mode without missing out on reception of data from the network device.

The common understanding of the DRX configuration of a UE may be based on certain timing parameters that may be preconfigured for UE during various states of operation in a wireless network. In 5G NR systems, a UE may operate in different RRC states in which various capabilities of UE are either activated or turned off in a predefined manner. A UE in RRC INACTIVE may be configured with eDRX cycle for both RRC IDLE state and RRC INACTIVE. The eDRX cycle for the two RRC state may be different. When eDRX cycle of any of the two RRC state is larger than 10.24 seconds, a so called PTW (paging time window) mechanism is applied to the paging operation.

This document provides methods that may be used for paging message transmission and monitoring for the case when UE is in RRC INACTIVE state, and is configured with eDRX for both RRC IDLE state and RRC INACTIVE state.

2. New Radio Paging Mechanism

Figure 4A:
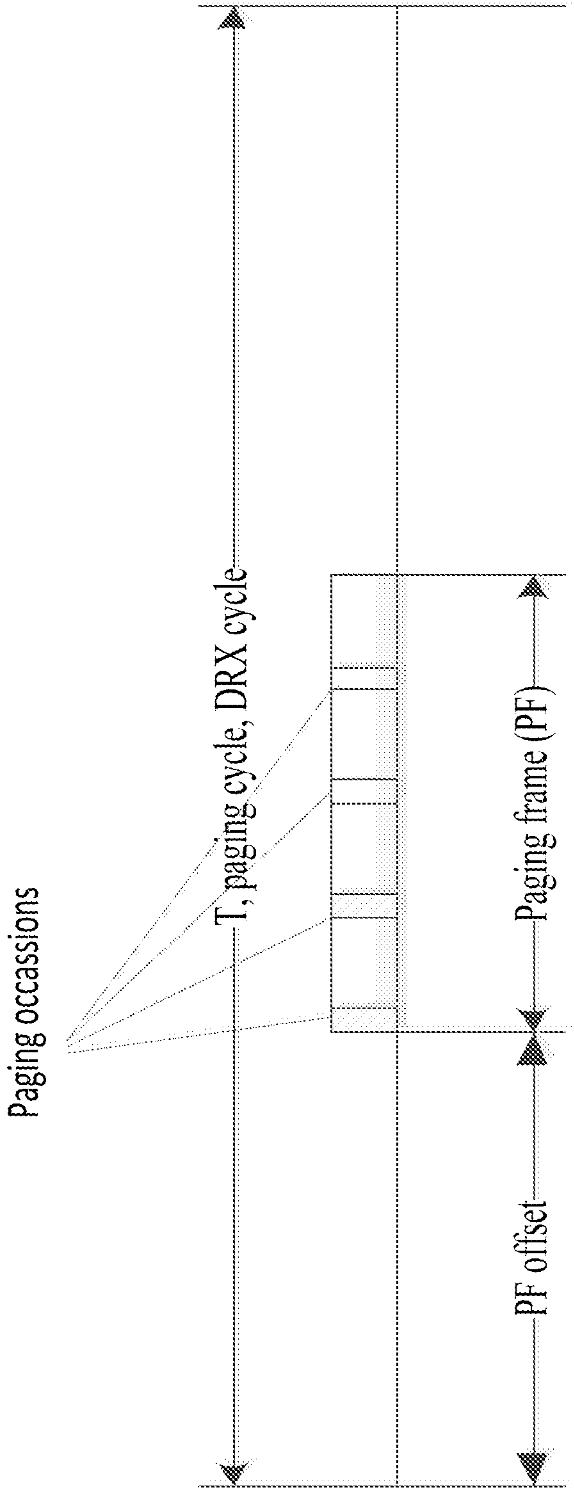
FIG. 4A illustrates an example timeline for a paging operation.

In the NR system, a UE is expected to monitor paging according to DRX cycle and PCCH configuration. A UE determines the time domain resource (paging frame and paging occasion within paging frame) according to the DRX cycle and paging configuration. The UE monitors paging message on the paging occasion. FIG. 4A shows an example of timeline of a paging operation. As shown in FIG. 4A, the horizontal axis represents time. The paging frame offset defines a time from the start of the DRX cycle to the start of the paging frame, within which paging occasions may occur for a UE. The paging frame may end prior to or at the end of DRC cycle.

The paging frame (PF) is determined according to following formula.

Subframe Number (SFN) for the PF is determined by:

$$(\text{SFN}+\text{PF\_offset}) \bmod T=(T \text{ div } N)*(\text{UE\_ID} \bmod N)$$

Index (i_s), indicating the index of the paging occasion (PO) is determined by:

$$i\_s=\text{floor}\,(\text{UE\_ID}/N) \bmod \text{Ns} \text{ ("mod" is the modulo function).}$$

Where:

T: DRX cycle of the UE (T is determined by the shortest of the UE specific DRX value(s), if configured by RRC and/or upper layers, and a default DRX value broadcast in system information. In RRC_IDLE state, if UE specific DRX is not configured by upper layers, the default value is applied);

N: number of total paging frames in T;

Ns: number of paging occasions for a PF;

PF_offset: offset used for PF determination which is configured by network;

UE_ID: 5G-S-TMSI mod 1024;

5G-S-TMSI is a 48 bit long bit string as defined in 3GGP Technical Specification TS 23.501. 5G-S-TMSI shall in the formula above be interpreted as a binary number where the left most bit represents the most significant bit.

eDRX and PTW Mechanism Examples

In the 3GPP LTE specification, PTW mechanism is used when eDRX cycle for RRC IDLE is larger than 10.24 s. The value of eDRX cycle may be a number of hyper system frame. A hyper system frame includes 1024 system frames. A hyper system frame number (H-SFN) may be transmitted in a system information of a cell to indicate the current hyper system frame number.

With the PTW mechanism, UE monitors paging occasions within a paging time window (PTW) if the eDRX cycle length is larger than 10.24 s. The PTW is UE-specific and is determined by a Paging Hyperframe (PH), a starting position within the PH (PTW_start), and an ending position (PTW_end) or length of PTW.

More specifically, UE in RRC INACTIVE monitor paging within the PTW for paging message initiated by CN (CN paging) and base station (RAN paging) according to following rule:

Within the PTW, PF (paging frame) and PO (paging occasion) is determined by setting T in the PF/PO formula as the shortest value of default DRX cycle, UE specific DRX cycle (UE specific paging cycle), and RAN paging cycle. The RAN paging cycle is configured by a base station and used for UE monitor RAN paging when UE is in RRC INACTIVE state.

Figure 4B:
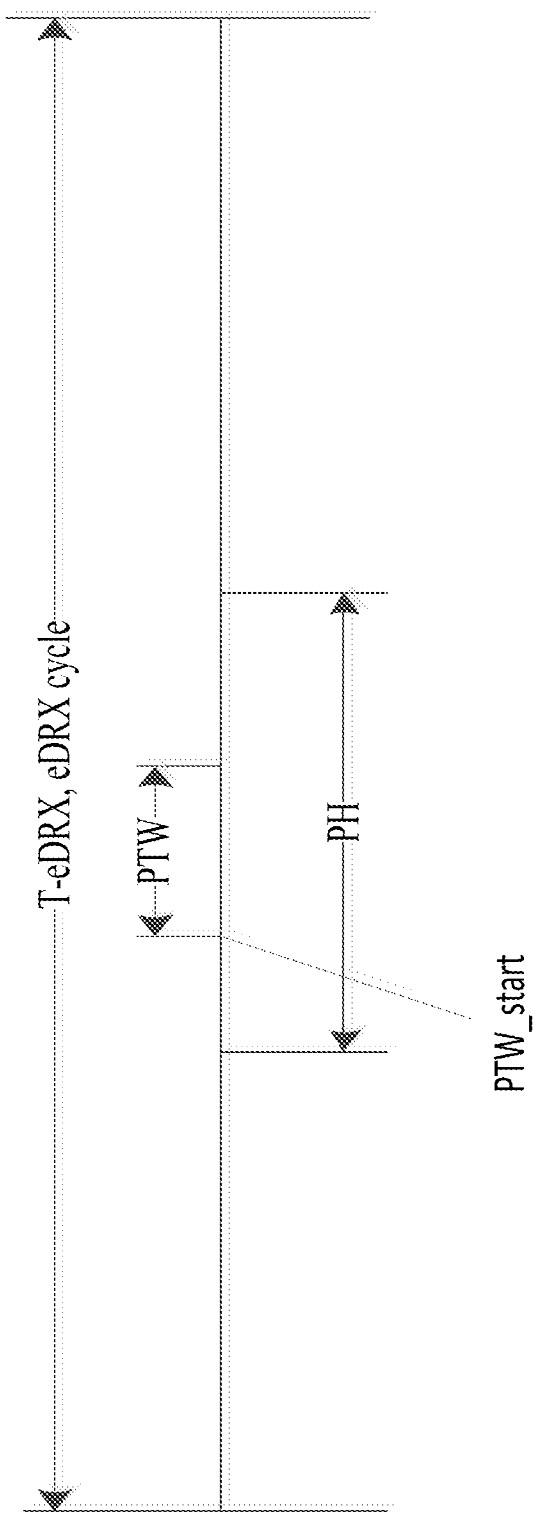
FIG. 4B illustrates another example timeline for a paging operation.

FIG. 4B shows an example of a timeline of the PTW mechanism. As depicted in FIG. 4B, the paging time window defines a time interval within a paging hyperframe, defined by a PTW start time during which paging may occur. The paging hyperframe is within a time interval defined by the extended DRX cycle and the PTW is within the paging hyperframe.

3. Example Embodiment 1

In NR, a UE may be configured with eDRX for both RRC IDLE state and RRC INACTIVE state. The UE may be configured with a RAN paging cycle when it is transited to RRC INACTIVE state. The UE in RRC INACTIVE state applies eDRX configuration for both RRC IDLE and RRC INACTIVE state to monitor both CN paging and RAN paging.

In the case that eDRX cycle for RRC IDLE is larger than 10.24 s (or PTW mechanism is applied), and eDRX cycle for RRC INACTIVE is equal to or shorter than 10.24 s (or PTW mechanism is not applied) the following operations may be performed:

PTW mechanism is applied according to eDRX cycle for RRC IDLE state.

Within the PTW, the UE monitor paging according to one of following rule:

Example Rule 1

Paging frame (PF) is determined by setting T as the shortest of default DRX cycle, UE specific DRX cycle if configured, and eDRX cycle for RRC INACTIVE, in the formula for PF calculation.

Paging occasion is determined by setting T as the shortest of default DRX cycle and UE specific DRX cycle if configured, or default DRX cycle if UE specific DRX cycle is not configured, in the formula for PO calculation. It may be noted that a UE can always monitor the right paging occasion. However, when RRC states mismatch between UE and what the network thinks the UE's RRC state is, e.g., UE in RRC INACTIVE but network thinks that UE is in RRC IDLE), a paging message may be missed in such a case.

Example Rule 2

Paging frame (PF) is determined by setting T as the shortest of default DRX cycle, UE specific DRX cycle if configured, and eDRX cycle for RRC INACTIVE, in the formula for PF calculation.

Paging occasion is determined by setting T as the shortest of default DRX cycle, UE specific DRX cycle if configured, and eDRX cycle for RRC INACTIVE, in the formula for PO calculation.

Outside the PTW, the UE monitor paging according to following rule:

PF is determined by setting T as eDRX cycle for RRC INACTIVE in the formula for PF calculation.

PO is determined by setting T as the shortest of default DRX cycle, and UE specific DRX cycle if configured.

Here, the default DRX cycle may be configured in the cell system information. The UE specific DRX cycle is configured by CN node to UE. The UE specific DRX cycle may be indicated to RAN node from CN. The eDRX cycle for RRC INACTIVE is configured to the UE via RRC message or upper layer message (e.g. NAS message between CN and UE).

In some embodiment, the eDRX cycle for RRC INACTIVE and RAN paging cycle are two separate information elements in an RRC Release message.

Correspondingly, the network node, including RAN node (base station) and CN (core network) transmit paging message according to the same rule.

With the method provided in the present document, in the case when eDRX cycle for RRC IDLE is larger than 10.24 s or PTW mechanism is applied, and eDRX cycle for RRC INACTIVE is not larger than 10.24 s, or PTW mechanism is not applied, the UE monitor paging within the PTW according to a proper PF/PO determination rule which take following aspect into consideration:

1. UE is required to monitor RAN paging according to the eDRX cycle for RRC INACTIVE, but not the RAN paging cycle (as in legacy mechanism) which is assumed shorter than eDRX cycle for RRC INACTIVE.
2. UE is required to monitor CN paging according to default DRX cycle, and UE specific DRX cycle if configured.
3. The principle that UE should monitor both CN paging and RAN paging when it is in RRC INACTIVE state is observed.
4. To avoid failure in paging receiving when RRC state of the UE is mismatched between UE and network, the PO is determined by DRX cycle for CN paging, e.g., rule 2.

4. Example Embodiment 2

In another example embodiment, a UE may be configured with eDRX for RRC IDLE state, and a RAN paging cycle, but not configured with an eDRX cycle for RRC INACTIVE.

In the case that eDRX cycle for RRC IDLE is larger than 10.24 s (or PTW mechanism is applied), the following operations may be performed:

PTW mechanism is applied according to eDRX cycle for RRC IDLE state.

Outside the PTW, the UE monitor paging according to following rule:

- PF is determined by setting T as the RAN paging cycle in the formula for PF calculation.
- PO is determined by setting T as the shortest of default DRX cycle, and UE specific DRX cycle if configured.

Within the PTW, the UE monitor paging according to following rule:

- Paging frame (PF) is determined by setting T as the shortest of default DRX cycle, UE specific DRX cycle if configured, and RAN paging cycle, in the formula for PF calculation.
- Paging occasion is determined by setting T as the shortest of default DRX cycle and UE specific DRX cycle if configured, or default DRX cycle if UE specific DRX cycle is not configured, in the formula for PO calculation.

The following solutions based on the above-discussed techniques may preferably implemented by some embodiments:

For example, the following solutions may be used for implementing the above described embodiment 1 in section 3.

Figure 1A:
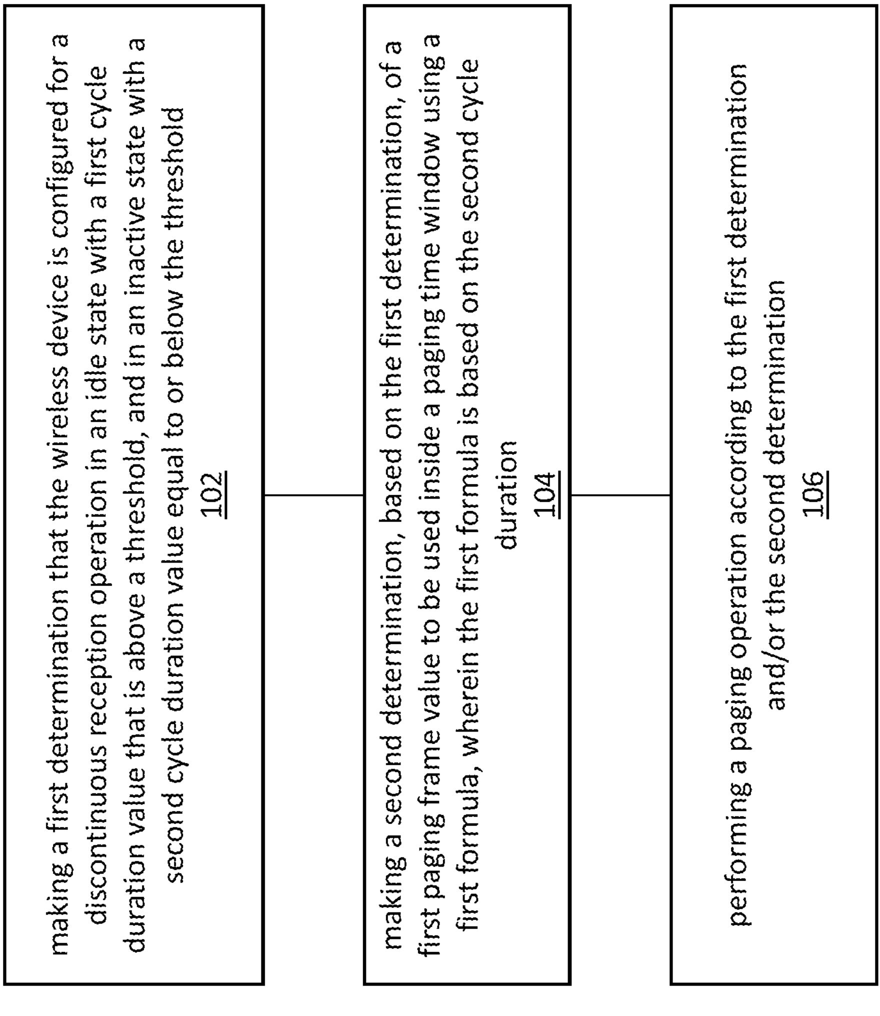
FIG. 1A is a flowchart representation of a wireless communication method in accordance with the present technology.

1. A method of wireless communication (e.g., method 100 depicted in FIG. 1A), comprising: making a first determination (102), by a wireless device, that the wireless device is configured for a discontinuous reception operation in an idle state with a first cycle duration value that is above a threshold, and in an inactive state with a second cycle duration value equal to or below the threshold; making a second determination (104), based on the first determination, of a first paging frame value to be used inside a paging time window using a first formula, wherein the first formula is based on the second cycle duration; and performing (106) a paging operation according to the first determination and/or the second determination.

2. The method of claim 1, wherein the first formula defines the first paging frame value based on a minimum of (a) the second cycle duration, (b) a default discontinuous reception cycle duration in the wireless network, and (c) a device-specific discontinuous reception cycle duration, in case that the device-specific discontinuous cycle duration is preconfigured for the wireless device.

3. The method of any of solutions 1-2, including determining a paging occasion for use inside the paging time window according to a second formula, wherein the second formula is based on (a) in case that a device-specific discontinuous cycle duration is not preconfigured for the wireless device, a default discontinuous reception cycle duration in the wireless network, or (b) in case that the device-specific discontinuous cycle duration is preconfigured for the wireless device, a minimum of the default discontinuous reception cycle duration in the wireless network and the device-specific discontinuous cycle duration.

4. The method of any of solutions 1-3, further including: making a third determination, based on the first determination, of a second paging frame value to be used outside the paging time window using a third formula that is based on the second cycle duration value.

5. The method of solution 4, including: making a fourth determination, based on a paging occasion for use outside the paging time window based on a fourth formula that is based on (a) in case that the device-specific discontinuous cycle duration is not preconfigured for the wireless device, the default discontinuous reception cycle duration in the wireless network, or (b) in case that the device-specific discontinuous cycle duration is preconfigured for the wireless device, a minimum of the default discontinuous reception cycle duration in the wireless network and the device-specific discontinuous cycle duration.

6. The method of any of solutions 1-5, wherein the first cycle duration value corresponds to an extended discontinuous reception cycle value for the idle state and wherein the second cycle duration value corresponds to an extended discontinuous reception cycle duration for the inactive state.

Figure 1B:
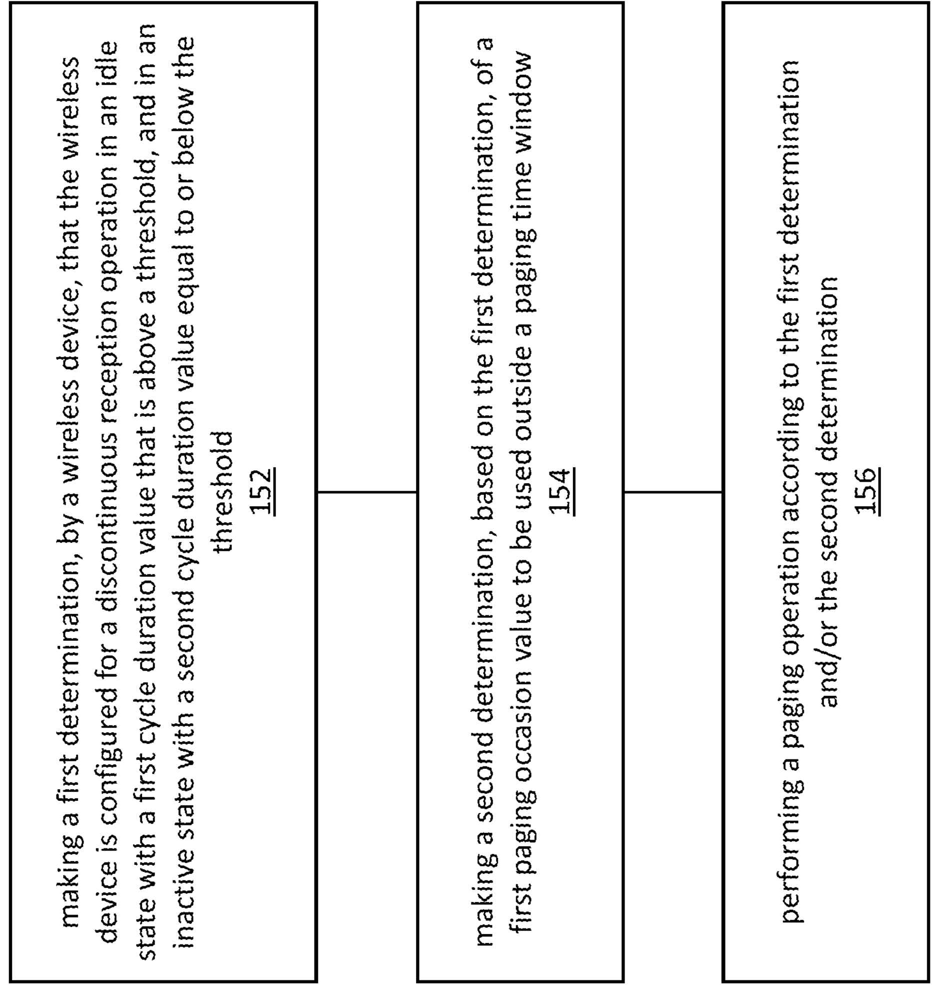
FIG. 1B is a flowchart representation of a wireless communication method in accordance with the present technology.

7. A method of wireless communication (e.g., method 150 depicted in FIG. 1B), comprising: making a first determination (152), by a wireless device, that the wireless device is configured for a discontinuous reception operation in an idle state with a first cycle duration value that is above a threshold, and in an inactive state with a second cycle duration value equal to or below the threshold; making a second determination (154), based on the first determination, of a first paging occasion value to be used outside a paging time window using a first formula, wherein the first formula is based on (a) in case that a device-specific discontinuous cycle duration is not preconfigured for the wireless device, a default discontinuous reception cycle duration in the wireless network, or (b) in case that the device-specific discontinuous cycle duration is preconfigured for the wireless device, a minimum of the default discontinuous reception cycle duration in the wireless network and the device-specific discontinuous cycle duration; and performing (156) a paging operation according to the first determination and/or the second determination.

8. The method of solution 7, wherein the method further includes determining a paging frame value for the wireless device using a second formula that is based on the second cycle duration value.

9. The method of any of solutions 7-8, wherein the first cycle duration value corresponds to an extended discontinuous reception cycle value for the idle state and wherein the second cycle duration value corresponds to an extended discontinuous reception cycle duration for the inactive state.

Figure 2A:
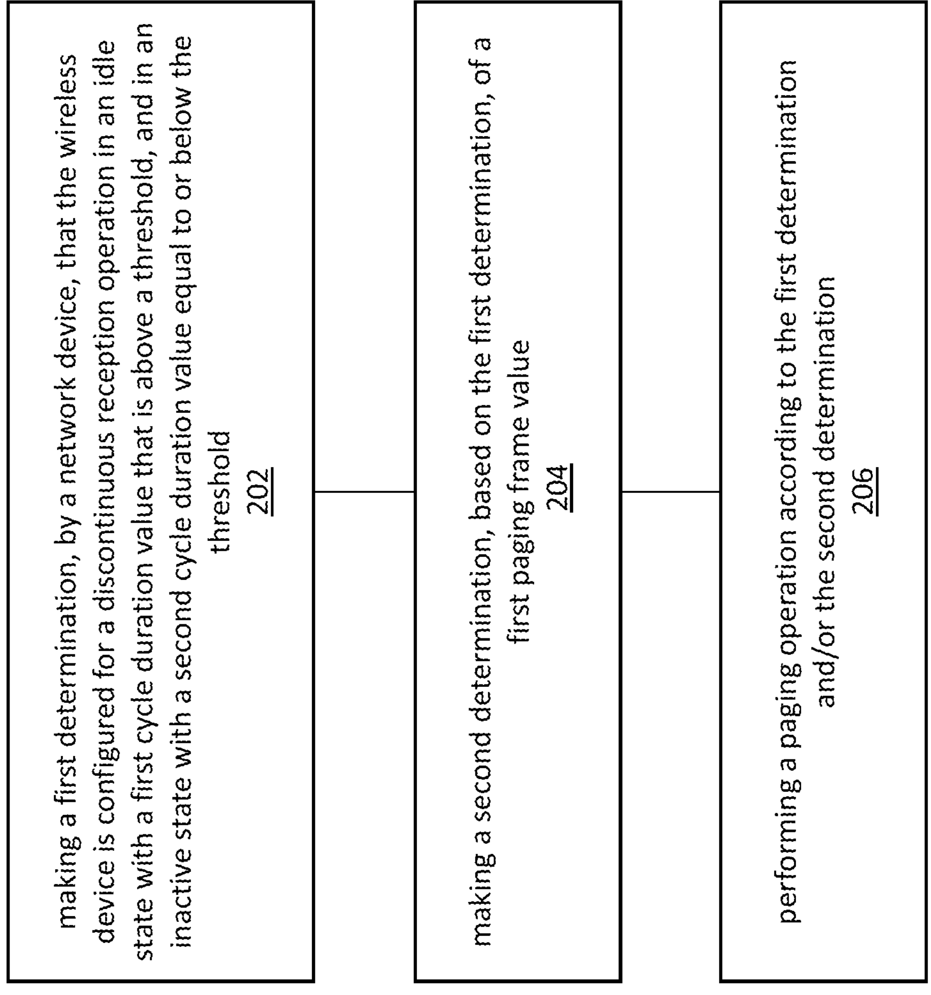
FIG. 2A is a flowchart representation of a wireless communication method in accordance with the present technology.

10. A method of wireless communication (e.g., method 200 depicted in FIG. 2A), comprising: making a first determination (202), by a network device, that the wireless device is configured for a discontinuous reception operation in an idle state with a first cycle duration value that is above a threshold, and in an inactive state with a second cycle duration value equal to or below the threshold; making a second determination (204), based on the first determination, of a first paging frame value to be used inside a paging time window using a first formula, wherein the first formula is based on the second cycle duration; and performing (206) a paging operation according to the first determination and/or the second determination.

11. The method of solution 10, wherein the first formula defines the first paging frame value as a minimum of (a) the second cycle duration, (b) a default discontinuous reception cycle duration in the wireless network, and (c) a device-specific discontinuous reception cycle duration, in case that the device-specific discontinuous cycle duration is preconfigured for the wireless device.

12. The method of any of solutions 10-11, including determining a paging occasion for use inside the paging time window according to a second formula, wherein the second formula is based on (a) in case that a device-specific discontinuous cycle duration is not preconfigured for the wireless device, a default discontinuous reception cycle duration in the wireless network, or (b) in case that the device-specific discontinuous cycle duration is preconfigured for the wireless device, a minimum of the default discontinuous reception cycle duration in the wireless network and the device-specific discontinuous cycle duration.

13. The method of any of solutions 10-12, further including: making a third determination, based on the first determination, of a second paging frame value to be used outside the paging time window using a third formula that is based on the second cycle duration value.

14. The method of solution 13, including: making a fourth determination, based on a paging occasion for use outside the paging time window based on a fourth formula that is based on (a) in case that the device-specific discontinuous cycle duration is not preconfigured for the wireless device, the default discontinuous reception cycle duration in the wireless network, or (b) in case that the device-specific discontinuous cycle duration is preconfigured for the wireless device, a minimum of the default discontinuous reception cycle duration in the wireless network and the device-specific discontinuous cycle duration.

15. The method of any of solutions 10-14, wherein the first cycle duration value corresponds to an extended discontinuous reception cycle value for the idle state and wherein the second cycle duration value corresponds to an extended discontinuous reception cycle duration for the inactive state.

Figure 2B:
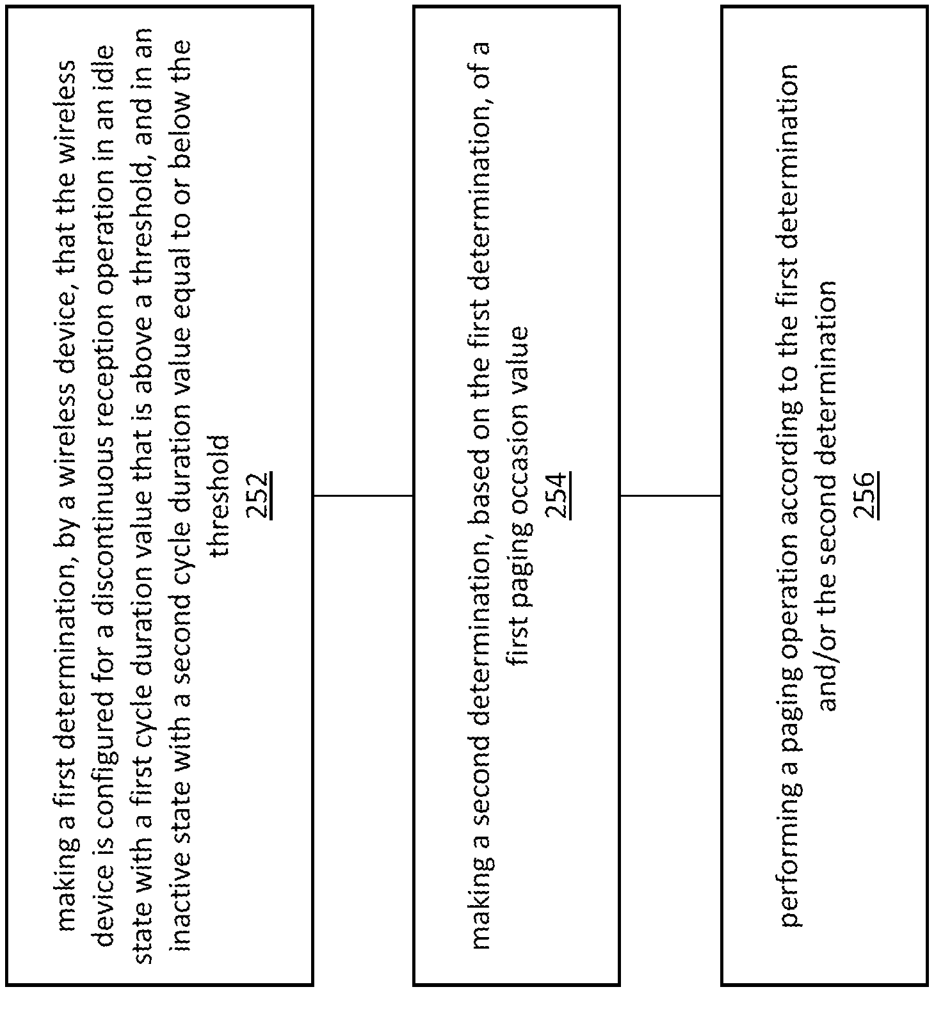
FIG. 2B is a flowchart representation of a wireless communication method in accordance with the present technology.

16. A method of wireless communication (e.g., method 250 depicted in FIG. 2B), comprising: making a first determination (302), by a wireless device, that the wireless device is configured for a discontinuous reception operation in an idle state with a first cycle duration value that is above a threshold, and in an inactive state with a second cycle duration value equal to or below the threshold; making a second determination (254), based on the first determination, of a first paging occasion value to be used outside a paging time window using a first formula, wherein the first formula is based on (a) in case that a device-specific discontinuous cycle duration is not preconfigured for the wireless device, a default discontinuous reception cycle duration in the wireless network, or (b) in case that the device-specific discontinuous cycle duration is preconfigured for the wireless device, a minimum of the default discontinuous reception cycle duration in the wireless network and the device-specific discontinuous cycle duration; and performing (256) a paging operation according to the first determination and/or the second determination.

17. The method of solution 16, wherein the method further includes determining a paging frame value for the wireless device using a second formula that is based on the second cycle duration value.

18. The method of solution 17, wherein the second formula defines the paging frame value as a minimum of (a) the second cycle duration. (b) a default discontinuous reception cycle duration in the wireless network, and (c) a device-specific discontinuous reception cycle duration, in case that the device-specific discontinuous cycle duration is preconfigured for the wireless device.

19. The method of any of solutions 16-18, wherein the first cycle duration value corresponds to an extended discontinuous reception cycle value for the idle state and wherein the second cycle duration value corresponds to an extended discontinuous reception cycle duration for the inactive state.

For example, the following solutions may be used for implementing the above described embodiment 2 in section 4.

Figure 3A:
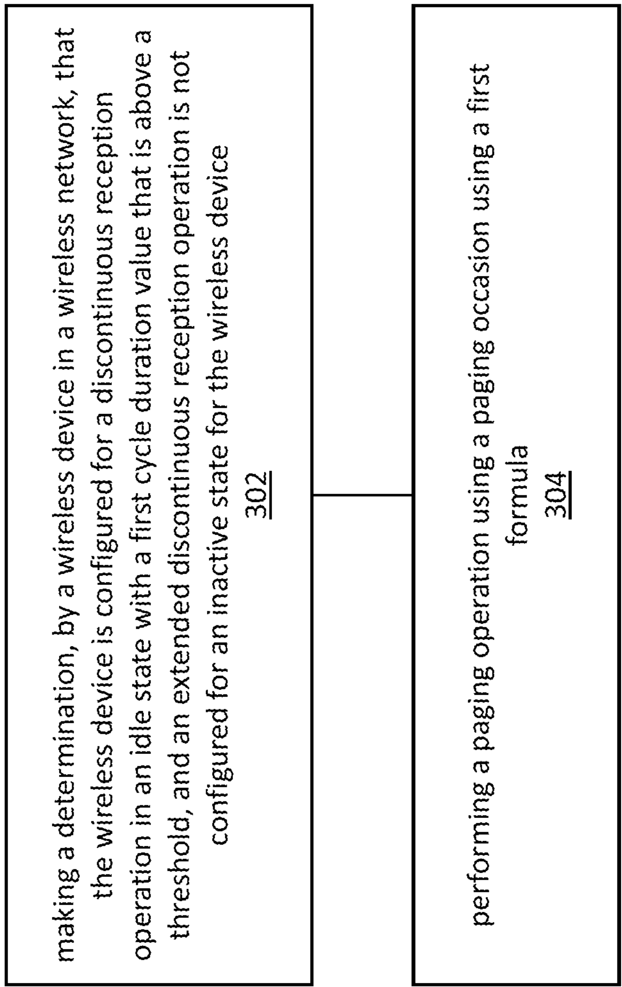
FIG. 3A is a flowchart representation of a wireless communication method in accordance with the present technology.

20. A method of wireless communication (e.g., method 300 depicted in FIG. 3A), comprising: making a determination (302), by a wireless device in a wireless network, that the wireless device is configured for a discontinuous reception operation in an idle state with a first cycle duration value that is above a threshold, and an extended discontinuous reception operation is not configured for an inactive state for the wireless device; and performing (304) a paging operation using a paging occasion using a first formula based on a minimum of (a) in case that a device-specific discontinuous cycle duration is not configured for the wireless device, the default discontinuous reception cycle duration in the wireless network, or (b) in case that the device-specific discontinuous cycle duration is preconfigured for the wireless device, a minimum of the default discontinuous reception cycle duration in the wireless network and the device-specific discontinuous cycle duration.

21. The method of solution 20, further including performing the paging operation that includes: (1) performing, outside a paging time window, the paging operation using a paging frame that is determined using a second formula based on a radio access network paging cycle value; or (2) performing, within the paging time window, the paging operation using the paging frame determined using the second formula based on a minimum value from (a) the default discontinuous cycle duration, (b) the radio access network paging cycle value and (c) in case that a device-specific discontinuous reception cycle value is configured for the wireless device, the device-specific discontinuous reception cycle value.

Figure 3B:
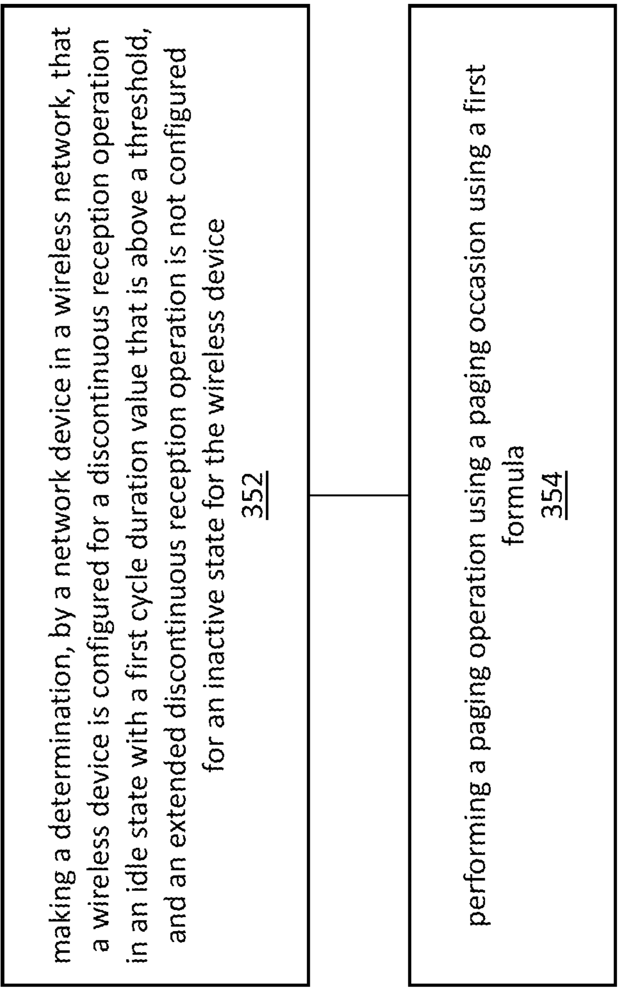
FIG. 3B is a flowchart representation of a wireless communication method in accordance with the present technology.

22. A method of wireless communication (e.g., method 350 depicted in FIG. 3B), comprising: making a determination (352), by a network device in a wireless network, that a wireless device is configured for a discontinuous reception operation in an idle state with a first cycle duration value that is above a threshold, and an extended discontinuous reception operation is not configured for an inactive state for the wireless device; and performing (354) a paging operation using a paging occasion using a first formula based on a minimum of (a) in case that a device-specific discontinuous cycle duration is not configured for the wireless device, the default discontinuous reception cycle duration in the wireless network, or (b) in case that the device-specific discontinuous cycle duration is preconfigured for the wireless device, a minimum of the default discontinuous reception cycle duration in the wireless network and the device-specific discontinuous cycle duration.

23. The method of solution 20, further including performing the paging operation that includes: (1) performing, outside a paging time window, the paging operation using a paging frame that is determined using a second formula based on a radio access network paging cycle value; or (2) performing, within the paging time window, the paging operation using the paging frame determined using the second formula based on a minimum value from (a) the default discontinuous cycle duration, (b) the radio access network paging cycle value and (c) in case that a device-specific discontinuous reception cycle value is configured for the wireless device, the device-specific discontinuous reception cycle value.

24. An apparatus, comprising a processor configured to implement a method recited in one or more of the above solutions.

25. A computer readable medium having processor executable code for implementing a method recited in any one or more of the above solutions stored thereon.

In some embodiments, the formulas disclosed in the above solutions may correspond to the formulas described in the current 5G NR standard or as described in section 2 of the present document.

In some embodiments, the idle state may correspond to the RRC IDLE state. In some embodiments, the inactive state may correspond to RRC INACTIVE state. For example, when the wireless device is in the idle state, the paging may be initiated by the RAN. For example, when the wireless device is in the idle state, paging may be initiated by the 5G core network.

Figure 5:
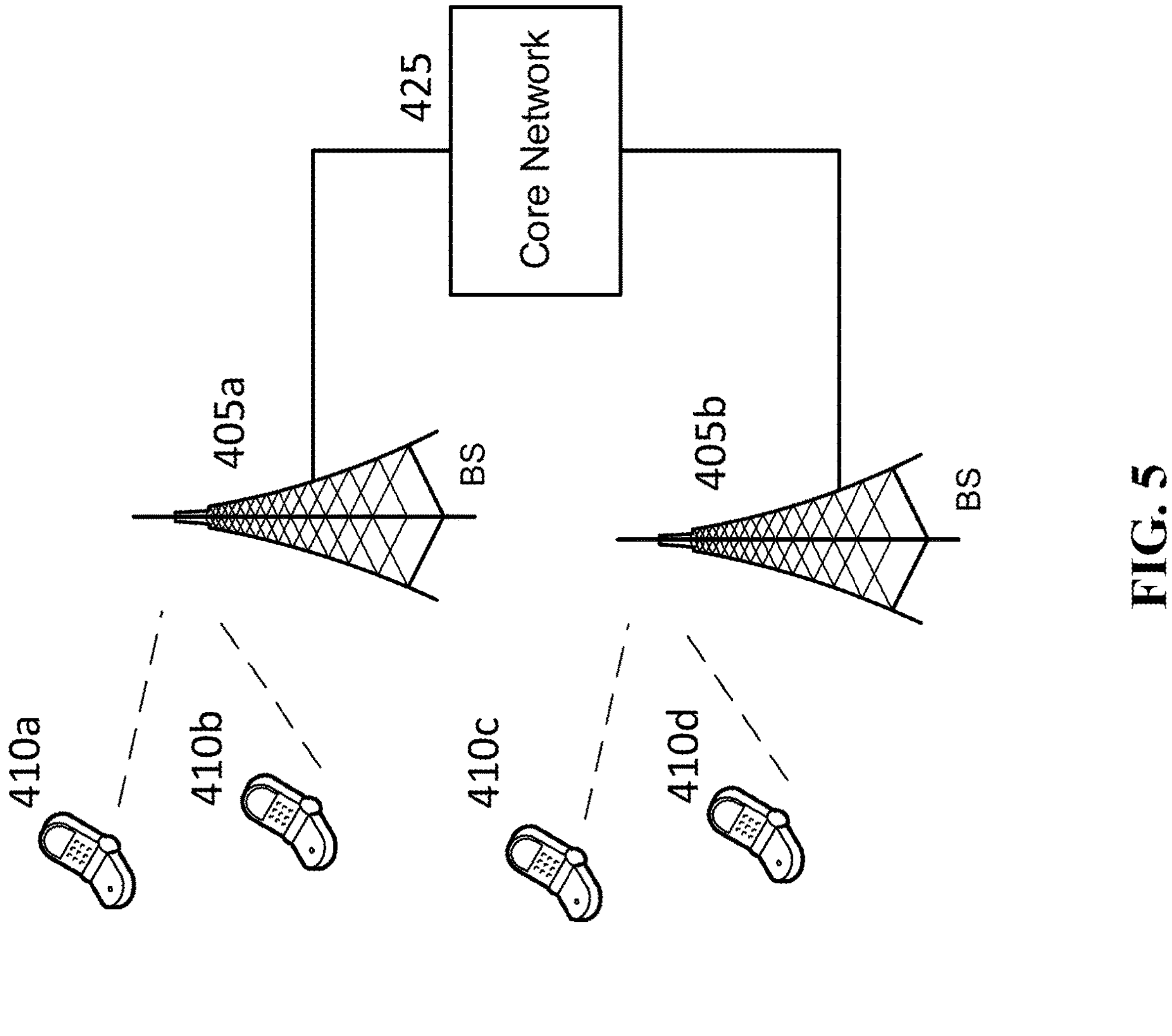
FIG. 5 shows an example of a wireless communication system where techniques in accordance with one or more embodiments of the present technology can be applied.

FIG. 5 shows an example of a wireless communication system 400 where techniques in accordance with one or more embodiments of the present technology can be applied. A wireless communication system 400 can include one or more base stations (BSs) 405*a*, 405*b*, one or more wireless devices 410*a*, 410*b*, 410*c*, 410*d*, and a core network 425. A base station 405*a*, 405*b* can provide wireless service to wireless devices 410*a*, 410*b*, 410*c* and 410*d* in one or more wireless sectors. In some implementations, a base station 405*a*, 405*b* includes directional antennas to produce two or more directional beams to provide wireless coverage in different sectors.

The core network 425 can communicate with one or more base stations 405*a*, 405*b*. The core network 425 provides connectivity with other wireless communication systems and wired communication systems. The core network may include one or more service subscription databases to store information related to the subscribed wireless devices 410*a*, 410*b*, 410*c*, and 410*d*. A first base station 405*a* can provide wireless service based on a first radio access technology, whereas a second base station 405*b* can provide wireless service based on a second radio access technology. The base stations 405*a* and 405*b* may be co-located or may be separately installed in the field according to the deployment scenario. The wireless devices 410*a*, 410*b*, 410*c*, and 410*d* can support multiple different radio access technologies. The techniques and embodiments described in the present document may be implemented by the base stations of wireless devices described in the present document.

Figure 6:
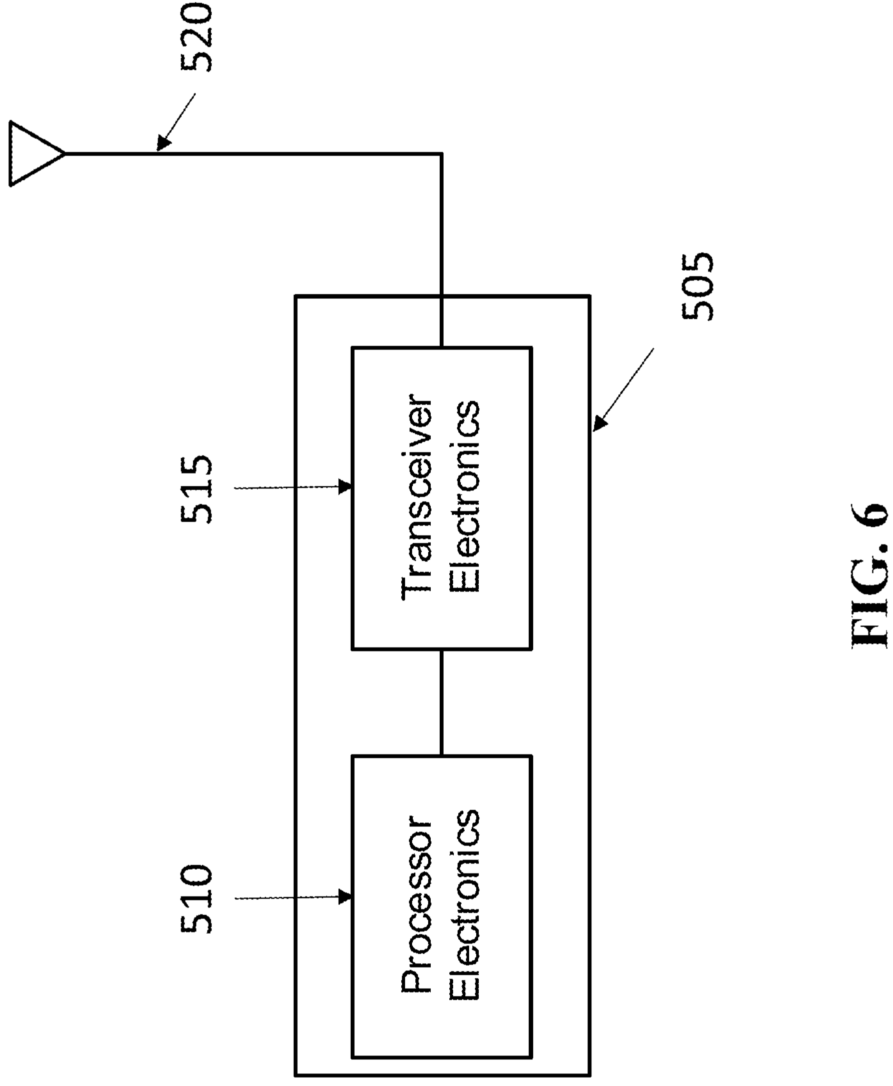
FIG. 6 is a block diagram representation of a portion of a radio station in accordance with one or more embodiments of the present technology can be applied.

FIG. 6 is a block diagram representation of a portion of a radio station in accordance with one or more embodiments of the present technology can be applied. A radio station 505 such as a base station (or a network device) or a wireless device (or UE) can include processor electronics 510 such as a microprocessor that implements one or more of the wireless techniques presented in this document. The radio station 505 can include transceiver electronics 515 to send and/or receive wireless signals over one or more communication interfaces such as antenna 520. The radio station 505 can include other communication interfaces for transmitting and receiving data. Radio station 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the radio station 505.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

The invention claimed is:

1. A method of wireless communication, comprising:

making a first determination, by a wireless device, that the wireless device is configured for a discontinuous reception operation in an idle state with a first cycle duration value that is above a threshold, and in an inactive state with a second cycle duration value equal to or below the threshold;

making a second determination, based on the first determination, of a first paging frame value to be used inside a paging time window using a first formula, wherein the first formula is based on the second cycle duration, wherein the first formula defines the first paging frame value based on a minimum of (a) the second cycle duration, (b) a default discontinuous reception cycle duration in the wireless network, and (c) a device-specific discontinuous reception cycle duration, in case that the device-specific discontinuous cycle duration is preconfigured for the wireless device;

determining a paging occasion for use inside the paging time window according to a second formula, wherein the second formula is based on (a) in case that a device-specific discontinuous cycle duration is not preconfigured for the wireless device, a default discontinuous reception cycle duration in the wireless network, or (b) in case that the device-specific discontinuous cycle duration is preconfigured for the wireless device, a minimum of the default discontinuous reception cycle duration in the wireless network and the device-specific discontinuous cycle duration; and performing a paging operation according to the first determination and/or the second determination.

2. The method of claim 1, further comprising:

making a third determination, based on the first determination, of a second paging frame value to be used outside the paging time window using a third formula that is based on the second cycle duration value.

3. The method of claim 2, comprising:

making a fourth determination, based on a paging occasion for use outside the paging time window based on a fourth formula that is based on (a) in case that the device-specific discontinuous cycle duration is not preconfigured for the wireless device, the default discontinuous reception cycle duration in the wireless network, or (b) in case that the device-specific discontinuous cycle duration is preconfigured for the wireless device, a minimum of the default discontinuous reception cycle duration in the wireless network and the device-specific discontinuous cycle duration.

4. The method of claim 1, wherein the first cycle duration value corresponds to an extended discontinuous reception cycle value for the idle state and wherein the second cycle duration value corresponds to an extended discontinuous reception cycle duration for the inactive state.

5. A wireless device comprising at least one processor, the at least one processor configured to:

make a first determination that the wireless device is configured for a discontinuous reception operation in: an idle state with a first cycle duration value that is above a threshold, and in an inactive state with a second cycle duration value equal to or below the threshold;

make a second determination, based on the first determination, of a first paging frame value to be used inside a paging time window using a first formula, wherein the first formula is based on the second cycle duration, wherein the first formula defines the first paging frame value based on a minimum of (a) the second cycle duration, (b) a default discontinuous reception cycle duration in the wireless network, and (c) a device-specific discontinuous reception cycle duration, in case that the device-specific discontinuous cycle duration is preconfigured for the wireless device;

determine a paging occasion for use inside the paging time window according to a second formula, wherein the second formula is based on (a) in case that a device-specific discontinuous cycle duration is not preconfigured for the wireless device, a default discontinuous reception cycle duration in the wireless network, or (b) in case that the device-specific discontinuous cycle duration is preconfigured for the wireless device, a minimum of the default discontinuous reception cycle duration in the wireless network and the device-specific discontinuous cycle duration; and perform a paging operation according to the first determination and/or the second determination.

6. The wireless device of claim 5, the at least one processor further configured to:

make a third determination, based on the first determination, of a second paging frame value to be used outside the paging time window using a third formula that is based on the second cycle duration value.

7. The wireless device of claim 6, the at least one processor further configured to:

making a fourth determination, based on a paging occasion for use outside the paging time window based on a fourth formula that is based on (a) in case that the device-specific discontinuous cycle duration is not preconfigured for the wireless device, the default discontinuous reception cycle duration in the wireless network, or (b) in case that the device-specific discontinuous cycle duration is preconfigured for the wireless device, a minimum of the default discontinuous reception cycle duration in the wireless network and the device-specific discontinuous cycle duration.

8. The wireless device of claim 5, wherein the first cycle duration value corresponds to an extended discontinuous reception cycle value for the idle state and wherein the second cycle duration value corresponds to an extended discontinuous reception cycle duration for the inactive state.

* * * * *